United States Patent [19]

Soane et al.

[11] Patent Number: 5,026,147
[45] Date of Patent: Jun. 25, 1991

[54] NON-LINEAR OPTICAL POLYMERIC ARTICLE AND METHOD

[75] Inventors: David S. Soane, Piedmont; Stephen E. Barry, Berkeley, both of Calif.

[73] Assignee: Regents of the University of California

[21] Appl. No.: 498,028

[22] Filed: Mar. 23, 1990

[51] Int. Cl.$^5$ .............................................. G02B 5/30
[52] U.S. Cl. .................................. 350/374; 350/96.34; 252/582; 252/584; 252/585
[58] Field of Search ................ 252/582, 584, 585; 350/374, 370, 377, 96.34, 96.12, 96.14

[56] References Cited

U.S. PATENT DOCUMENTS

| | | | |
|---|---|---|---|
| 4,859,876 | 8/1989 | Dirk et al. | 252/582 |
| 4,865,430 | 9/1989 | DeMartino et al. | 350/376 |
| 4,877,530 | 10/1989 | Moses . | |
| 4,948,225 | 8/1990 | Rider et al. | 350/374 |
| 4,955,977 | 9/1990 | Dao et al. | 350/374 |

OTHER PUBLICATIONS

Williams, *Agnew. Chem. Int. Ed. Engl.*, vol. 23, pp. 690–703 (1984).
Singer et al., *Appl. Phys. Lett.*, vol. 23, pp. 248–250 (1986).
J. S. Chiou, J. W. Barlow, & D. R. Paul, *J. Appl. Polym. Sci.*, vol. 30.
T. S. Chow, *Macromolecules*, vol. 13, p. 362 (1980).
A. R. Berens, Ann. AICHE Meeting, Paper 37e, Nov. 1987.
G. K. Fleming & W. J. Koros, *Macromolecules*, vol. 19, p. 2285 (1986).

*Primary Examiner*—Mark Hellner
*Attorney, Agent, or Firm*—Majestic, Parsons, Siebert & Hsue

[57] ABSTRACT

Articles exhibiting non-linear optical properties useful as electrooptic devices are prepared where the dopant moieties are aligned at relatively low temperatures. An intermediate article is formed by swelling with a diluent including a pressurized gas, such as carbon dioxide. The dopant moieties dispersed in the polymer are aligned by applying an electric field while maintaining the polymer in the swollen state caused by diluent sorption. Substantially all the diluent can then be removed without the necessity of a temperature elevation above about room temperature since the pressurized gas of the diluent can be removed by lowering the pressure to about atmospheric conditions. Polymers with high glass transition temperatures, preferably at or above about 150° C., can thus be used in preparing electrooptic devices.

35 Claims, 2 Drawing Sheets

NON-LINEAR OPTICAL POLYMERIC ARTICLE AND METHOD

FIELD OF THE INVENTION

The present invention generally relates to non-linear optical materials useful in preparing devices such as electrooptic modulators, wave guides and switches, and particularly relates to the fabrication of electric field poled polymer glasses that can be fabricated without resort to elevated temperatures.

BACKGROUND OF THE INVENTION

Applications for non-linear optics include optical switching and electrooptic processing devices useful in, for example, telecommunications. Electrooptic devices generally provide electrical control of the direction, phase, frequency and/or amplitude of light wave signals. Materials fabricated with non-linear optical properties can be integrated with electronic devices on a semiconductor chip, laser or other solid-state devices to form monolithic optical or electrooptical semiconductor devices.

When a local electric field E induces polarization P in a molecule, then Equation 1 illustrates the polarization when E is expanded in powers of the electric field.

$$P = \alpha E + \beta E^2 + \gamma E^3 + \ldots \quad (1)$$

The first term $\alpha$ is the linear polarization and is the origin of the refractive index if the field E is associated with an electromagnetic wave in the optical frequency range. When an electromagnetic field interacts with a molecular medium, the field polarizes the molecules. These polarized molecules act as oscillating dipoles broadcasting electromagnetic radiation. For a non-linear molecule the induced polarization is a non-linear function of the applied field so that the first non-linear term $\gamma$ of Equation 1 makes a significant contribution to the induced frequency components.

Non-centrosymmetric crystals can exhibit harmonic generation frequency doubling ($2\omega$), sometimes also called "second harmonic generation" or "SHG". This is the conversion of coherent light of frequency $\omega$ into light of frequency $2\omega$. Another example of a second-order non-linear optical effect is the Pockels effect where a DC field is applied to a medium through which an optical wave propagates. Again, this effect arises though $\beta$.

Molecules containing conjugated $\pi$ electronic systems with charge asymmetry exhibit very large values of $\beta$. U.S. Pat. No. 4,859,876, discussed below, describes many examples of suitable non-centrosymetric organic molecules containing conjugated $\pi$ electron systems useful as dopants in materials having non-linear optic properties. Examples of other suitable polymers and dopants are given in U.S. Pat. No. 4,865,430, issued Sept. 12, 1989, inventors DeMartino et al.

As further background, a thermodynamic model and summaries of methods for measuring non-linear optical responses are discussed in the publications by Williams, *Angew. Chem. Int. Ed. Engl.* 23, pp. 690–703 (1984) and Singer et al. *Appl. Phys. Lett.*, 49, pp. 248–250 (1986).

In order to produce observable second harmonic generation, a system must not possess a center of symmetry. One way to remove the center of symmetry is to align molecules with a permanent dipole moment by imposing a DC electric field. That is, for systems that consist of dopant molecules with permanent electric dipole moments in a polymer matrix, an applied electric field may be utilized to align the dopant molecules, thereby creating a noncentrosymmetric medium. When the alignment energy resulting from the interaction of the electric field is small compared to the thermal energy, an oriented gas model may be employed to predict the second harmonic generation coefficient. If the molecules are constrained in this position, then the second harmonic generation coefficient (often represented as $X^{(2)}$) can be predicted through the simplified formula of Equation 2 for low field strengths with respect to the thermal energy where the alignment of molecules in an electric field is found to vary approximately with the strength of the electric field and the inverse of temperature:

$$X^{(2)} \sim N\beta \frac{\mu E}{kT} \quad (2)$$

Where N represents the number of dopant molecules, $\beta$ can be viewed as the intrinsic molecular hyperpolarizability of dopant (its definition being given by Equation 1), $\mu$ is the dopant permanent dipole moment, E is the applied electric field, and kT is the Boltzmann energy. As is seen from this approximate thermodynamic prediction, one wants N as large as possible, $\beta$ as large as possible, E as large as possible, but T as low as possible. The electric field is, however, limited by dielectric breakdown of the polymer and N is limited by phase separation and solubility considerations.

U.S. Pat. No. 4,859,876, issued Aug. 22, 1989, inventors Dirk et al., describe an electrooptical directional coupler or switch with channel wave guides. These wave guides are comprised of an optical quality glassy polymer host doped with a directionally ordered array of non-centrosymetric polar organic molecules which exhibit second order optical susceptibility in response to an applied field. This material is formed by means of spin coating as a 1$\mu$ thick film on a substrate such as silicon wafers. The film is formed of a non-crystalline, glassy polymer in which a dopant, such as red azo dye, is present as non-centrosymmetric organic molecules dissolved in the polymer. This film is raised about 5°–40° C. above the glass-rubber transition temperature of the polymer by slow heating and a poling voltage is then applied across the film. The film is then cooled followed by an annealing step. The poling voltage is then removed.

However, the use of heat to reach a glass transition temperature while aligning dopant has disadvantages in that there is a loss of ordering of the dopant due to the elevation of temperature used to bring about the rubbery state of the polymeric matrix. Also, as the temperature is increased, the strength of the field needed to obtain a given degree of orientation of the dopant is increased. The temperatures required for a thermally induced glass transition of the polymeric materials, such as described by U.S. Pat. No. 4,859,876, are low enough that significant dopant orientation is possible. However, the use of polymers possessing (relatively) low Tg's shortens the lifetime during which the material retains SHG. It has been shown that there is significant loss of the SHG signal with time due to sub Tg relaxations of the polymer. The relaxation problem is magnified in that the guest chromophores are expected to lower the Tg of the supporting matrix. This plastization process results in the further attenuation of SHG intensities.

It has been shown that increasing the Tg of the polymer matrix results in a more persistent SHG signal. As the temperature needed to bring about the glass transition is increased, the strength of the field needed to obtain a given degree of orientation of the chromophore is increased. However, the strength of the electric field applied to orient the chromophore is limited by the dielectric breakdown strength of the material. Thus, for polymers with high Tg it is not always feasible to use a thermally induced glass transition for alignment purposes.

Japanese laid-open patent application No. 44427/89, laid-open on Feb. 16, 1989, assigned to Fujitsu Limited, describes a high molecular weight organic non-linear optical material formed by placing a solution in which a dopant and polymer have been dissolved with an is evaporated while applying a high voltage between the electrodes and the solution is solidified. The organic solvent exemplified is dichloromethane. This approach avoids the problems associated with using a thermally induced glass transition, but use of an organic liquid solvent creates its own problems in that it is very difficult to remove all traces of such solvents without resorting to elevated temperatures. Retention of even minute amounts of the solvent leads to microdomains in which the polymer is plasticized. Further, the polymer selection is limited by the liquid solvent one can use.

Accordingly, there remains a need for better methods of fabricating polymers with non-linear optical properties for applications such as in electrooptic devices.

SUMMARY OF THE INVENTION

It is an object of the present invention to increase the number of polymers that can be used as matrix materials for applications requiring optical non-linearity so that, for example, polymers with high glass transition temperatures (e.g., polycarbonates, substituted styrenics, acrylics, methacrylics, phenolics, and other thermoplastics and thermosets that are stable at high temperatures) are available for use as the matrix materials.

It is another object of the present invention that the dopant moieties used in such polymeric matrix materials can be aligned (and substantially stably "frozen" in the desired alignment) at relatively low temperatures so as to prevent loss of ordering.

We believe that practical, long-lived matrix materials for applications requiring optical non-linearity need to be based on highly rigid polymeric matrices exhibiting high glass transition temperature values.

In one aspect of the present invention, an intermediate article is provided useful in preparing subsequent articles that exhibit non-linear optical properties. The intermediate article comprises a body formed primarily of a polymer in which dopant moieties are dispersed. A diluent for the polymer is sorbed by the body and includes a pressurized gas. Without the presence of the diluent the polymer has a glass transition temperature that is at least greater than room temperature, more preferably greater than about 100° C. However, with the sorbed diluent the intermediate article has an altered glass transition temperature that is lower than the original glass transition temperature, preferably approaching or about room temperature. The sorbed diluent is removable from the body without substantial temperature elevation, and when so removed the polymer returns to having substantially the same glass transition temperature as before the diluent was sorbed. While the diluent is sorbed the dopant moieties can be aligned into a degree of the same orientation.

Suitable gasses for serving as all or part of the diluent include carbon dioxide, nitrogen or a fluorocarbon, which are all capable of supercritical fluid formation. Further, these gases, when pressurized and used as diluent, are entirely removable from the polymeric matrix.

In another aspect of the present invention, a method for preparing articles exhibiting non-linear optical properties is provided where the intermediate article is formed by swelling with the diluent and then aligning the dopant moieties while maintaining the polymeric matrix in the swollen state. Substantially all the diluent is then removed without the necessity of a temperature elevation above about room temperature since the pressurized gas of the diluent can be removed by lowering the pressure to atmospheric conditions. An annealing step, again without resort to temperature elevation, can then be performed to further enhance alignment.

Articles obtainable from the intermediate article when practicing the inventive method have excellent non-linear polarizability properties and can be fabricated, for example, as thin films carried by a wide variety of substrates, such as glass, quartz, aluminum, phosphorus doped oxide on silicon wafers, thermal oxide coated silicon wafers, lithium niobate and conductive indium-tin oxide coatings on glass. Thus, materials of the invention are suitable as solid-state devices for applications such as optical wave guides, piezoelectric transducers, and other electrooptical modulators, switches and the like devices.

Particularly preferred articles of the invention are electrooptic devices where a thin film is carried on the surface of a substrate. The film is formed primarily by a polymeric matrix having a $Tg_1$ that is at least about 150° C. A minor amount of dopant moieties are present in this polymeric matrix and have a degree of the same orientation that is representable by $X^{(2)}$, where $X^{(2)}$ is at least about $10^{-9}$ esu.

Other objects and advantages of the present invention will become apparent upon reading the following description.

DETAILED DESCRIPTION OF THE PREFERRED EMBODIMENTS

Figure 1:
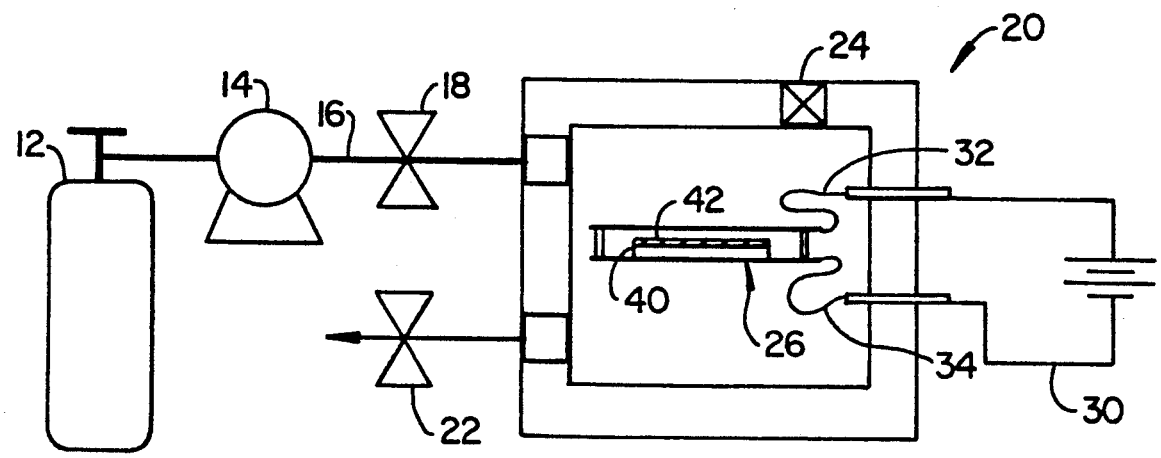
FIG. 1 schematically illustrates a poling apparatus useful in practicing the subject invention.

One embodiment of the invention is an intermediate article that is useful in preparing subsequent articles (e.g. solid-state devices or components) that exhibit non-linear optical properties. These subsequent articles can be fabricated as thin films carried by a variety of substrates, as desired and suitable for particular electrooptic applications. Particularly preferred subsequent articles have $Tg_1$ (glass transition temperature) of about 150° C. or greater and achieve a degree of alignment for the dopants that will be more fully described hereinafter. Suitable substrates can be nonconductive, semiconductive or conductive and include materials such as glass, quartz, aluminum, phosphorus doped oxide on silicon wafers, thermal oxide coated silicon wafers, and conductive indium-tin oxide coatings on glass. Semiconductive substrates are particularly preferred for many of the contemplated applications.

As just one specific example, thin films of the invention can be carried on a crystal of lithium niobate where the inventive film is etched by means known to the art. When light is flowed on the crystal it is confined to wave guides in the crystal. The wave guides are defined by a surrounding material of lower refractive index. Thus, the device can serve as an electrooptical switch since when the proper voltage is applied, then light is transferred from one guide to another.

Articles obtained subsequent to the inventive intermediate article provide significant second harmonic generation in use. This property can be generally quantified by $X^{(2)}$ of the earlier-discussed Equation 2, where $X^{(2)}$ is at least about $10^{-9}$esu, more preferably on the order of about 10 esu.

Articles of the invention will normally have a film thickness from about a submicron range ($10^{-1}\mu$) to a typical upper dimension of about $10\mu$. The normal process of spin coating, well known to the art, is suitable in achieving thin films of uniform thickness with these dimensions.

It is normally preferred for the thin films to be substantially amorphous and transparent. While crystalline materials are possible, the possibility of crystal boundaries that would tend to disrupt or interfere with desired optical properties can be avoided when the material is amorphous. Transparency is necessary for applications such as optical wave guides.

The intermediate article comprises a body formed primarily of a polymer and secondarily (or as a minor amount) of dopant moieties being dispersed in the body. The polymer can be viewed as a polymeric matrix in which the dopant moieties are dispersed. This dispersal can take several forms.

The more typical dispersal is where an admixture of polymer and dopant is formed, is solubilized, and the solution is then coated on the desired substrate. Removal of the solvent used, such as in a spin coating process, may be accomplished at elevated temperatures. The use of elevated temperatures at this stage of practicing the invention does not adversely affect the intermediate and subsequent articles, since orientation of dopant has not yet occurred. To insure complete removal of solvent at this stage, the precursor thin film can be baked at elevated temperatures under vacuum.

This precursor body (formed before formation of the inventive intermediate article) has polymer with a first glass transition temperature representable by $Tg_1$ where $Tg_1$ is at least greater than room temperature (that is, on the order of about 15° C.-32° C.).

However, the dopant moieties can also be dispersed in the body by being covalently bound to the polymer (such as side chains) or covalently bound within the polymer (such as part of the polymeric backbone). An advantage of covalent linkage is that the dopants are prevented from any tendency to act as plasticizers for the polymer. When incorporated directly into the polymer backbone, then dopant density is maximized, the necessity for flexible linker groups is reduced or circumvented, and deterioration of the polar alignment is hindered because additional relaxation modes are eliminated. Preferably, covalently bound embodiments for the dopants are where the dopant dipoles lie perpendicular to the polymer's molecular axis. This eliminates the requirement for large scale segmental rearrangements of polymer chains during poling processes. Also, simple rotations around the linker groups that connect the dopant within the polymer will allow for the necessary alignment during poling.

However, for convenience the embodiment where dopant and polymer are simply admixed will hereinafter be more specifically described.

The dopant moieties are typically a minor amount of the body because of solubility limitations. One normally wishes to "load" the polymer with as much dopant as possible. Normal loading is on the order of about 10 wt. %, although higher loading is more desired.

A very large number of known polymers are useful in practicing the invention. For example, the isotropic acrylic polymers and copolymers described by U.S. Pat. No. 4,865,430 are suitable polymers. The various acrylic based polymers, e.g., polymethylacrylate and polymethylmethacrylate discussed in U.S. Pat. No. 4,859,876 are also suitable. However, polymers having a $Tg_1$ of at least about 100° C., and even more preferably on the order of about 150° C., are particularly preferred. These relatively high temperature stable thermoplastics and thermosets include, for example, polycarbonates, substituted styrenics (e.g. poly($\alpha$)methylstyrene), acrylics, methacrylics, polyesters, polyamides and copolymers thereof.

Suitable dopant moieties must have a high intrinsic molecular hyperpolarizability. Appropriate dopants are known to the art and typically include various dyes with conjugated aromatic rings. Illustrative such dyes are azos and anilines. These dyes typically contain extremely electron-rich and electron-deficient groups linked as to provide a conjugated $\pi$-system. A typical such dye, is for example, p, p'-dimethylaminonitrostilbene (DANS) and Disperse Red 1.

In practicing the invention, a first polymeric matrix having dopant moieties dispersed therein is provided. This first polymeric matrix has a first glass transition temperature $Tg_1$ that is at least greater than room temperature and the dopant moieties are in a substantially non-aligned relationship. It should be understood that by "substantially non-aligned relationship" is meant non-aligned in the sense that there is no microscopic noncentrosymmetry, although where the dopant is incorporated directly into the polymer backbone or covalently linked to the backbone as side chains with or without spacer arms there may be certain symmetry on a molecular scale with respect to the polymer backbone.

This first polymeric matrix, typically a thin film carried on a desired substrate, is then swelled with a diluent. The diluent must include a pressurized gas either as the entire amount of diluent or as part of the diluent. The former is preferred and will first be discussed.

The pressurized gas should become supercritical at moderate pressures and near ambient temperatures and is used so that the swelling is conducted with the gas being pressurized to a pressure that is effective for reducing the $Tg_1$ to a second glass transition temperature ($Tg_2$) that is lower than the $Tg_1$, preferably where $Tg_2$ is about room temperature. Suitable such supercritical gasses are carbon dioxide, nitrogen and various of the fluorocarbons. At ambient temperature carbon dioxide will cause many polymers to undergo their glass transition when pressurized between about 400 psi to about 700 psi (that is, about 7 atmospheres to about 60 atmospheres).

Use of gasses capable of supercriticality, even though the pressurized gas does not have to be in the supercritical state, is necessary since when these gases are near supercritical, then their solubilities in the polymers are very high. Further, the sorption and desorption of gas in the polymer matrix is easily controlled through the raising and lowering of the system pressure (thus raising and lowering the activity of the gas). Substantially all the gas is readily removed after orienting the dopant by reducing pressure of the system. There is then no significant residual gas left in the polymer matrix after depressurization to act as plasticizer and thus to trigger Tg relaxations.

While the second polymeric matrix is maintained in the swollen state, the dopant moieties are aligned into a degree of the same orientation. This degree of ordering can be represented as the second harmonic generation coefficient $X^{(2)}$. In practicing the invention it is preferred that $X^{(2)}$ be at least $10^{-9}$ esu, more preferably about $10^{-8}$ esu. This is achieved through applying sufficient electric field to the swollen second polymeric matrix, such as on the order of 100,000V-cm for on the order of about 10 minutes or more.

After poling (and preferably while the electric field is still imposed on the swollen polymer) an annealing step is preferably performed. This annealing, (or "aging"), step can be by lowering the pressure of the pressurized gas diluent so that an intermediate glass transition temperature for the still swollen polymer is achieved that is higher than about ambient temperature but lower than the $Tg_1$. That is, $Tg_1$ is greater than the intermediate (annealing) Tg which in turn is greater than $Tg_2$. A typical lowered pressure when using carbon dioxide is a pressure of about 200 psi. Holding the swollen polymer at this intermediate glass transition temperature, for example for about 10 minutes or more, permits the polymeric matrix to densify, or contract, and helps trap the desired orientation of dopant moieties even better. The pressure then should be slowly decreased with electric field still applied. Thus, this "sub Tg" annealing step enhances temporal stability of alignment.

Turning to FIG. 1, a poling apparatus 10 suitable for preparing articles exhibiting non-linear optical properties as just described is schematically illustrated. A source 12 of pressurized gas is in fluid communication with an optional pump 14 via conduit 16 and controllably introduced by means of valve 18 into pressure chamber 20. Pump 14 is usually optional since the pressure of the pressurized gas itself is typically sufficient for flow into pressure chamber 20. Vent valve 22 permits depressurization of pressure chamber 20 when the sorbed gas is desorbed (and during annealing) and pressure gauge 24 can be used to monitor the process.

A substrate holder 26 is disposed within pressure chamber 20. High voltage supply 30 is electrically connected via leads of 32, 34 to substrate holder 26. The substrate 40 itself is disposed in substrate folder 26 and has the precursor thin film, or precursor polymeric body, carried by substrate 40.

In practice, the pressurized gas is flowed through conduit 16 into pressure chamber 20. When the precursor layer 42 is sufficiently swollen, then voltage source 30 is used to apply high voltage and thus to align the dopant moieties (while free to rotate due to the swollen polymeric state). The optional annealing step is performed. The polymer rotation is then constrained, or "frozen", by then depressurizing to atmospheric, or venting the chamber, so that the sorbed gas is desorbed.

The necessary pressurized gas may also be used as a codiluent where a liquid diluent has also been used to swell the polymer. The pressurized gas at near-critical or approaching supercritical is then used for the additional function of coextracting the other diluent. Such coextraction with the pressurized gas may be useful in lowering the second glass transition temperature to even lower values than possible where the pressurized gas is the sole diluent, but avoids retention of some residual liquid diluent since the pressurized gas functions as an extractant. The removal of the diluent, whether entirely pressurized gas or partly pressurized gas, may be facilitated through use of vacuum while the body is still under the poling electric field.

The invention will now be further illustrated by the following examples, which are intended to illustrate but not limit the invention.

EXAMPLE 1

A first embodiment of the invention was prepared where the dopant was the azo dye Disperse Red 1 (4-[N-ethyl-N-(2-hydroxyethyl)] amino-4$^1$-nitroazobenzene). The polymer was PMMA. This system was chosen for the large reported second order susceptibility of the dopant and because there was a relatively low carbon dioxide pressure required to induce the glass transition in PMMA. However, because PMMA has a glass transition temperature 105° C., it is not a particularly preferred embodiment of the invention.

The azo dye and PMMA (12 wt. % dye and 88 wt. % PMMA) were dissolved in methyl ethyl ketone as solvent and then conventionally spin coated on a glass slide. The glass slide was coated with a conducting layer (indium tin oxide) so that it served as an electrode in a parallel plate capacitor. This capacitor was used to apply the electric field in orienting the dye. The solvent was completely removed by heating to 60° C. under a vacuum of 190 torr. A flat metal plate was used as the other electrode in the capacitor and was place on a spacer above the film. The spacer allowed the sorption of diluent into the polymer matrix.

The pressure of the system was 500psia and the gas was carbon dioxide. This was above the necessary 400psia pressure of $CO_2$ that at ambient temperatures causes PMMA to undergo the glass transition. It is not believed that higher pressures greatly enhance the rotational mobility in the rubbery phase, and higher pressures than about 500psia were observed to cause phase separation of the azo dye from PMMA.

The spin coating produced a film about 1μ thick which was annealed at 50° C. under a mild vacuum for at least 24 hours.

Poling was done by applying an electric field of 100,000V-cm using a Kiethley Instruments 240A high voltage supply. The pressurized gas and electric field were applied for 10 minutes, after which the vessel was depressurized down to atmospheric pressure. The time to depressurize was approximately 1 minute. The electric field was maintained for 10 minutes after depressurization to insure that the dopant orientation was not lost.

Figure 2:
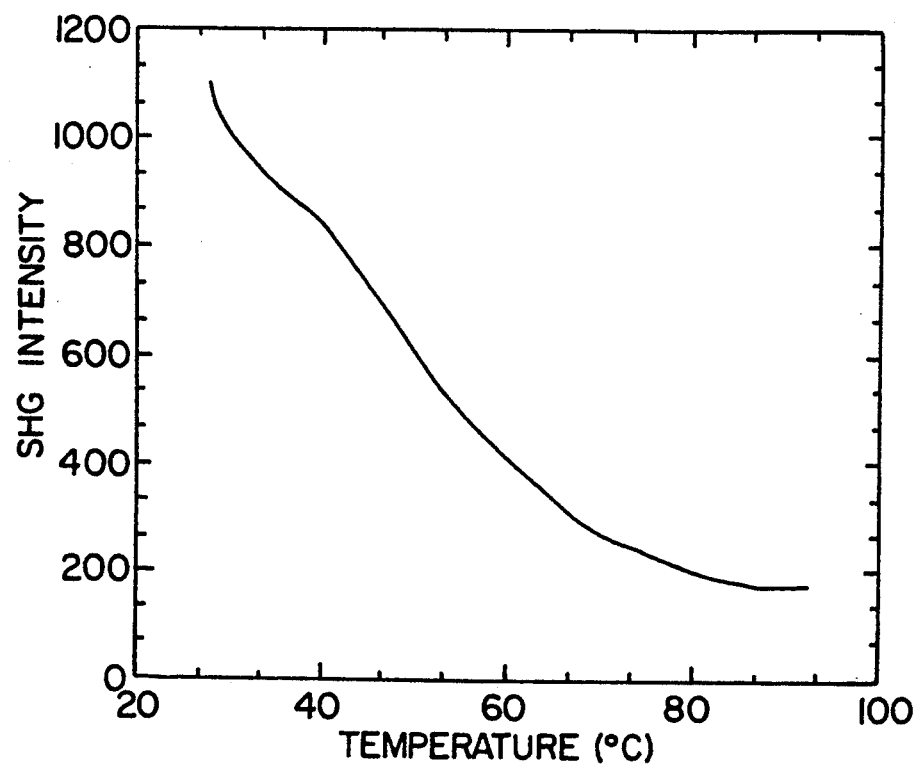
FIG. 2 graphically illustrates data taken from one embodiment of the invention (where the polymer was poly(methylmethacrylate) [PMMA]), and has second harmonic generation [SHG]intensity plotted as a function of temperature.
Figure 3:
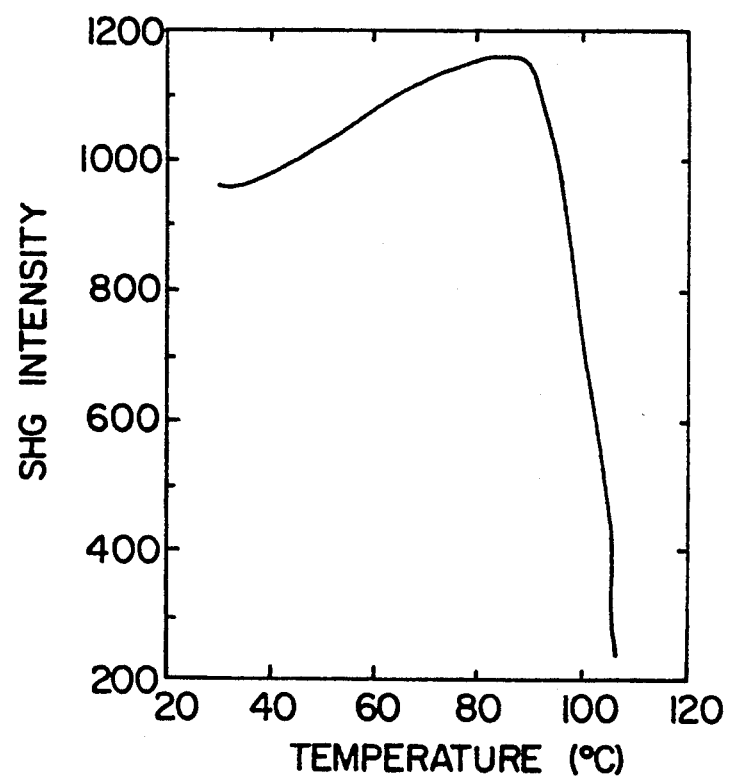
FIG. 3 is similar to FIG. 2, but illustrates data taken from another embodiment of the invention (where the polymer was polycarbonate).

The sample was then tested for SHG using a Q switched fundamental at a wavelength of 1.06μm produced from a Nd:YAG laser. The laser power was 100 mw. The fundamental was P-polarized, with an incident angle of 60° relative to the sample. The second harmonic produced by the same was measured in reflection. The SHG intensity was measured as a function of temperature. As the temperature is increased, the SHG is expected to decrease due to thermal randomization of chromophore orientation. At the glass transition, all order is expected to disappear, after which an observed SHG The sample was then tested for SHG using a Q switched fundamental at a wavelength of 1.06μm produced from a Nd:YAG laser. The laser power was 100 mw. The fundamental was P-polarized, with an incident angle of 60° relative to the sample. The second harmonic produced by the same was measured in reflection. The SHG intensity was measured as a function of temperature. As the temperature is increased, the SHG is expected to decrease due to thermal randomization of chromophore orientation. At the glass transition, all order is expected to disappear, after which an observed SHG should be constant and attributable to surface effects only. FIG. 2 shows the results, which demonstrate that the alignment method was successful.

EXAMPLE 2

A second, more preferred embodiment of the invention was prepared where the dopant was the azo dye Disperse Red 1 (0.4 wt. %) and the polymer was polycarbonate (14.5 wt. %). The dye and polymer were dissolved in pyridine (85.1 wt. %) as the spin coating solvent and then conventionally spin coated on a glass slide. The spin coating and solvent removal was as described for Example 1.

Sorption diluent into the polymer matrix was by means of a pressure system at 825psi and the gas was carbon dioxide. Even at this pressure the carbon dioxide has not yet liquified (liquification occurs at about 900psi), but operating at about 825psi was found desireable for increased solubility.

Poling was performed as described by Example 1, but the electric field was applied for seven minutes. The vessel was then depressurized down to atmospheric pressure over a period of three minutes and the electric field was maintained for twenty minutes after depressurization.

I claim:

1. An intermediate article, useful in preparing articles therefrom exhibiting non-linear optical properties, comprising:
    a body formed primarily of a polymer, the polymer having a first glass transition temperature representable by $Tg_1$, the $Tg_1$ being at least greater than room temperature;
    a minor amount of dopant moieties being dispersed in the body, the dopant moieties having a high intrinsic molecular hyperpolarizability, the dopant moieties being alignable upon application of sufficient electric field into a determinable degree of the same orientation, the degree of orientation being representable by a value $X^{(2)}$; and,
    a diluent for the polymer being sorbed by the body in an amount sufficient to form a second glass transition temperature representable by $Tg_2$, the $Tg_2$ being lower than the $Tg_1$, the diluent including a fluid that is gaseous at about atmospheric pressure and that is pressurized with respect to atmospheric pressure.

2. The intermediate article as in claim 1 wherein the $Tg_1$ is greater than about 100° C. and the $Tg_2$ is about room temperature.

3. The intermediate article as in claim 1 or 2 wherein the fluid becomes supercritical near ambient temperature with sufficient pressure.

4. The intermediate article as in claim 3 wherein the fluid includes $CO_2$, $N_2$ or a fluorocarbon gas, 5. The intermediate article as in claim 3 wherein the fluid is $CO_2$ and is pressurized to at least about 400 psi.

6. The intermediate article as in claim 1 wherein substantially all the sorbed diluent is removable from the body without substantial temperature elevation, and the polymer again has substantially the same $Tg_1$ when diluent is removed.

7. The intermediate article as in claim 3 wherein the body forms a substantially transparent thin film carried on or forming part of a solid-state device.

8. The intermediate article as in claim 7 wherein the body is substantially amorphous.

9. The intermediate article as in claim 7 wherein the $Tg_1$ is at or greater than about 150° C.

10. The intermediate article as in claim 7 wherein the dopant moieties are in an amount from about 1 wt.% to about 15 wt.% of the body.

11. The intermediate article as in claim 3 wherein the dopant moieties are dopant molecules admixed with the polymer.

12. The intermediate article as in claim 3 wherein the dopant moieties are covalently bound to or within the polymer.

13. The intermediate article as in claim 9 wherein a subsequent article is obtainable from the intermediate article following diluent removal, the subsequent article having a sufficient $X^{(2)}$ to achieve significant second harmonic generation.

14. The intermediate article as in claim 2 wherein $X^{(2)}$ is at least about $10^{-9}$ esu.

15. The intermediate article as in claim 1 wherein substantially all the diluent is pressurized gas.

16. A method for preparing articles exhibiting non-linear optical properties comprising:
    providing a first polymeric matrix having dopant moieties dispersed therein, the first polymeric matrix having a first glass transition temperature representable by $Tg_1$, the $Tg_1$ being at least greater than room temperature, the dopant moieties being in a sustantially non-aligned relationship;
    swelling the first polymeric matrix with a diluent, the diluent including $CO_2$, $N_2$ or a fluorocarbon gas, to form a second polymeric matrix swollen with respect to the first polymeric matrix, the second polymeric matrix having a second glass transition temperature representable by $Tg_2$, the $Tg_2$ being lower than the $Tg_1$, the gas being pressurized with respect to atmospheric;
    aligning the dopant moieties into a degree of the same orientation, the orientation degree representable by $X^{(2)}$, the aligning conducted while maintaining the second polymeric matrix in the swollen state; and,
    removing substantially all the diluent from the second polymeric matrix at about room temperature to form a polymeric matrix substantially having the $Tg_1$ but with the dopant moieties maintaining the orientation degree $X^{(2)}$.

17. The method as in claim 16 wherein the gas is capable of supercritical state formation, and the swelling is conducted with the gas being pressurized to a pressure effective for reducing the $Tg_1$ to the $Tg$ of about room temperature.

18. The method as in claim 17 wherein the aligning is conducted by imposing an electromagnetic field on the second polymeric matrix.

19. The method as in claim 17 wherein is at least about 10 esu

20. The method as in claim 17 wherein the gas is $CO_2$ and is pressurized to at least about 27 atmospheres.

21. The method as in claim 16 wherein the dopant moieties are dopant molecules admixed with polymer of the first polymeric matrix.

22. The method as in claim 16 wherein the dopant moieties are covalently bound to or within the polymeric matrix.

23. The method as in claim 16 wherein the first polymeric matrix is provided as a thin film.

24. The method as in claim 23 wherein the thin film is formed by spin coating before the swelling step.

25. The method as in claim 16 further comprising densifying the second polymeric matrix and forming an intermediate polymeric matrix, the intermediate polymeric matrix having an intermediate glass transition temperature less than the $Tg_1$ but greater than the $Tg_2$.

26. An intermediate product exhibiting non-linear optical properties prepared by the process comprising:
providing a first polymeric matrix having dopant moieties dispersed therein, the first polymeric matrix having a first glass transition temperature representable by $Tg_1$, the $Tg_1$ being at least greater than room temperature, the dopant moieties being in a sustantially non-aligned relationship;
swelling the first polymeric matrix with a diluent, the diluent including $CO_2$, $N_2$ or a fluorocarbon gas, to form a second polymeric matrix swollen with respect to the first polymeric matrix, the second polymeric matrix having a second glass transition temperature representable by $Tg_2$, the $Tg_2$ being lower than the $Tg_1$, the gas being pressurized with respect to atmospheric; and,
aligning the dopant moieties into a degree of the same orientation, the orientation degree representable by $X^{(2)}$;, the aligning conducted while maintaining the second polymeric matrix in the swollen state.

27. The intermediate product as in claim 26 wherein the gas is capable of supercritical state formation, and the swelling is conducted with the gas being pressurized to a pressure effective for reducing the $Tg_1$ to the $Tg_2$ of about room temperature.

28. The intermediate product as in claim 27 wherein the aligning is conducted by imposing an electromagnetic field on the second polymeric matrix.

29. The intermediate product as in claim 27 wherein $X^{(2)}$ is at least about 10 esu.

30. The intermediate product as in claim 27 wherein the gas is $CO_2$ and is pressurized to at least about 200 psi.

31. The intermediate product as in claim 26 wherein the dopant moieties are dopant molecules admixed with polymer of the first polymeric matrix.

32. The intermediate product as in claim 26 wherein the dopant moieties are covalently bound to or within the polymeric matrix.

33. The intermediate product as in claim 26 wherein the first polymeric matrix is provided as a thin film.

34. The intermediate product as in claim 33 wherein the thin film is formed by spin coating before the swelling step.

35. The intermediate product as in claim 33 wherein the thin film is carried on a semiconductor substrate.

* * * * *

UNITED STATES PATENT AND TRADEMARK OFFICE
CERTIFICATE OF CORRECTION

PATENT NO. : 5,026,147
DATED : JUNE 25, 1991
INVENTOR(S) : DAVIS S. SOANE; STEPHEN E. BARRY

It is certified that error appears in the above-identified patent and that said Letters Patent is hereby corrected as shown below:

Column 11, line 1, in Claim 17: replace "Tgof" with --$T_{g2}$ of--

Column 11, line 6, in Claim 19: insert --$X^{(2)}$-- after "wherein"

Column 11, line 7, in Claim 19: replace "10" with --$10^{-9}$--

Column 11, line 7, in Claim 19: add --.-- after "esu"

Column 12, line 7, in Claim 26: delete ";"

Column 12, line 18, in Claim 29: replace "10" with --$10^{-9}$--

Signed and Sealed this

Tenth Day of November, 1992

Attest:

DOUGLAS B. COMER

*Attesting Officer*  *Acting Commissioner of Patents and Trademarks*